(12) United States Patent
Kim et al.

(10) Patent No.: US 7,033,527 B2
(45) Date of Patent: Apr. 25, 2006

(54) HIGHLY POROUS CERAMICS FABRICATED FROM PRECERAMIC POLYMER AND EXPANDABLE MICROSPHERES, AND METHOD FOR FABRICATING THE SAME

(75) Inventors: Young-Wook Kim, Seoul (KR); Hai-Doo Kim, Kyungsangnam-do (KR); Shin-Han Kim, Seoul (KR); Chul-B Park, Ontario (CA)

(73) Assignee: Korea Institute of Machinery and Materials, Daejeon (KR)

(*) Notice: Subject to any disclaimer, the term of this patent is extended or adjusted under 35 U.S.C. 154(b) by 17 days.

(21) Appl. No.: 10/670,040

(22) Filed: Sep. 23, 2003

(65) Prior Publication Data
US 2005/0012233 A1    Jan. 20, 2005

(30) Foreign Application Priority Data
Jul. 16, 2003   (KR) .................. 10-2003-0048538

(51) Int. Cl.
*C04B 33/32* (2006.01)
(52) U.S. Cl. ......................... 264/43; 264/44
(58) Field of Classification Search .......... 264/43, 264/44
See application file for complete search history.

(56) References Cited

U.S. PATENT DOCUMENTS

| | | | | |
|---|---|---|---|---|
| 3,387,940 A | * | 6/1968 | McHenry et al. | 423/448 |
| 4,122,139 A | * | 10/1978 | Yajima et al. | 264/44 |
| 5,358,910 A | * | 10/1994 | Atwell et al. | 501/88 |
| 5,558,908 A | * | 9/1996 | Lukacs III et al. | 427/228 |
| 5,571,848 A | * | 11/1996 | Mortensen et al. | 521/61 |
| 5,616,650 A | * | 4/1997 | Becker et al. | 525/102 |
| 5,750,449 A | * | 5/1998 | Niihara et al. | 501/80 |
| 6,087,024 A | * | 7/2000 | Whinnery et al. | 428/613 |
| 6,231,793 B1 | * | 5/2001 | Strasser et al. | 264/45.1 |

* cited by examiner

*Primary Examiner*—Sean Vincent
(74) *Attorney, Agent, or Firm*—Cooper & Dunham LLP

(57) ABSTRACT

Disclosed herein are a highly porous ceramic having a high porosity of not less than 60% and a pore density of not less than $10^8$ pores/cm$^3$ fabricated from expandable microspheres and a preceramic polymer, and a method for fabricating highly porous ceramic. The method for fabricating highly porous ceramic from expandable microspheres and a preceramic polymer comprises the steps of: homogeneously mixing a preceramic polymer powder and expandable hollow microspheres, if necessary, a ceramic powder, and molding the mixture to form a molded body; heating the molded body to expand it; curing the expanded molded body; and pyrolyzing the cured molded body.

Since the highly porous ceramic has a higher porosity and pore density than conventional porous ceramics, it can be suitably used for various high temperature structure materials, kiln furniture, bulletproof materials, shock-absorbing materials, insulating materials, refractory materials, light-weight structure materials, etc.

7 Claims, 2 Drawing Sheets

HIGHLY POROUS CERAMICS FABRICATED FROM PRECERAMIC POLYMER AND EXPANDABLE MICROSPHERES, AND METHOD FOR FABRICATING THE SAME

BACKGROUND OF THE INVENTION

1. Field of the Invention

The present invention relates to a highly porous ceramic fabricated from expandable microspheres and a preceramic polymer, and a method for fabricating the highly porous ceramic. More particularly, the present invention relates to a highly porous ceramic having a high porosity of not less than 60% and a pore density of not less than $10^8$ pores/cm$^3$ fabricated using expandable microspheres and a preceramic polymer as starting materials wherein the size and the distribution of the pores are uniform and the porosity can be easily controlled, and a method for fabricating the highly porous ceramic. The highly porous ceramic thus fabricated can be suitably used for various structural materials, refractory materials, kiln furniture, insulating materials, shock-absorbing materials, bulletproof materials, lightweight structural materials, and so on.

2. Description of the Related Art

In general, porous ceramics are materials which can be used in a wide range of applications, such as various high temperature structural materials, high temperature refractory materials, kiln furniture, shock-absorbing materials, bulletproof materials, lightweight structural materials, insulating materials, and the like.

When the porous ceramics have a low porosity, they are disadvantageous in terms of poor insulating properties, low specific strength (strength per unit weight) and low cost-effectiveness of materials.

In addition, when the porous ceramics have a non-uniform pore size distribution or non-uniform distribution of pores in the porous ceramics, stresses applied to the porous ceramics cannot be equally distributed throughout the ceramics. Accordingly, the applied stresses are concentrated on more porous region, thus deteriorating the strength of the porous ceramics and making the strength distribution throughout the porous ceramics non-uniform.

Further, in the case that the porous ceramics are used as insulating materials and refractory materials, non-uniform pore size distribution or non-uniform distribution of pores in the porous ceramics results in poor heat transfer properties, which makes thermal gradient in the porous ceramics non-uniform.

Accordingly, high porosity of porous ceramics and uniformity of pore distribution and size are important in terms of the performance and quality of porous ceramics.

Generally, the porous ceramics are fabricated in accordance with two procedures as follows:

First, a ceramic is mixed with a pyrolyzable material or volatile material. Thereafter, gases are evolved by the pyrolysis of the pyrolyzable material or volatilizing the volatile material, and the evolving gases form pores in the ceramic to fabricate a porous ceramic (see, e.g., U.S. Pat. Nos. 5,358,910 and 5,750,449).

In summary, after a ceramic and a preceramic polymer are mixed with each other by a ball milling process, the mixture is molded into a desired shape. The molded body is heated to fire combustible components and volatilize volatile components contained in the preceramic polymer (pyrolysis). The ceramic components contained in the molded body are sintered by heating, and the volatile components contained in the preceramic polymer are volatilized to form pores within the molded body, thereby fabricating a final porous ceramic.

However, this method has a disadvantage that when the content of the polymeric components is not less than 50%, the shape of the molded body may collapse due to softening and pyrolysis of the polymeric components. Accordingly, it is difficult to fabricate highly porous ceramics having a porosity of 70% or more. Further, uniform distribution of pores is difficult to obtain and pore size cannot be easily controlled according to the material properties.

Second, a porous ceramic can be fabricated by lowering the sinterability of a ceramic. This method is divided into the following two procedures. The first method is carried out by sintering a ceramic below optimum sintering temperature to lower the relative density of the ceramic, thereby forming more pores within the ceramic. However, since the porous ceramic thus fabricated is not sintered at optimum sintering conditions, mechanical properties such as strength may be greatly deteriorated.

Additionally, U.S. Pat. No. 6,214,078 discloses a method for fabricating a porous ceramic. According to this method, first relatively coarse grains and relatively fine grains are mixed with each other. After the mixture is molded into a molded body having a particular shape, the molded body is sintered by heating. At this time, since the relatively coarse grains have a relatively low surface energy that acts as a driving force for the sintering, they impede the sintering. Since the relatively fine grains have a relatively high vapor pressure, they tend to evaporate and condense on the relatively coarse grains. The condensation of the relatively fine grains lowers the relative density to fabricate a porous ceramic. However, this method has disadvantages in that it is difficult to fabricate highly porous ceramics having a porosity of 50% or more, and the pore size is non-uniform.

On the other hand, U.S. Pat. Nos. 5,158,986 and 5,334,356 disclose methods for producing microcellular plastic materials, although they are not directed to ceramics.

According to these methods, $CO_2$ in a supercritical state is introduced into a plastic material to saturate the plastic material, and then rapidly depressurized to evolve supersaturated $CO_2$ from the plastic material. The evolving $CO_2$ forms micropores in the plastic material to produce a microcellular plastic material.

The microcellular plastic material produced by using $CO_2$ in a supercritical state as a blowing agent for forming micropores has uniformly distributed micropores throughout the plastic material.

However, since $CO_2$ is substantially insoluble in ceramics, the above methods cannot be applied to ceramics. In addition, the methods involve complex process operations, such as saturation of the polymer plastic material in an autoclave, depressurization, curing, pyrolysis, etc.

SUMMARY OF THE INVENTION

Therefore, the present invention has been made in view of the above problems, and it is an object of the present invention to provide a highly porous ceramic having a high porosity of not less than 60% and a pore density of not less than $10^8$ pores/cm$^3$ fabricated using expandable hollow microspheres and a preceramic polymer as starting materials wherein the highly porous ceramic is fabricated by mixing the starting materials, molding the mixture into a molded body, expanding the molded body at atmospheric pressure (1 atm), followed by curing and pyrolysis, and the pores are uniformly distributed throughout the preceramic polymer.

It is another object of the present invention to provide a method for fabricating the highly porous ceramic.

The present inventors have conducted intensive research with a view to solving the above-mentioned disadvantages. As a result, the present inventors have found that a highly porous ceramic having a high porosity of not less than 60% and a pore density of not less than $10^8$ pores/cm$^3$ can be fabricated by mixing expandable hollow microspheres and a preceramic polymer, if necessary, a ceramic powder, as starting materials, molding the mixture into a molded body, heating the molded body at 110~200° C. to expand the hollow microspheres and to form uniformly distributed pores throughout the preceramic polymer, followed by curing and pyrolysis.

The term "preceramic polymer" used herein refers to a polymer material that consists of ceramic components and volatile components and can be converted to a ceramic by heat treatment.

The term "expandable hollow microspheres" used herein refers to spherical materials having a diameter of 5–50 μm, each of which consists of a shell made of polymethylmethacrylate (PMMA) and an inner medium filled with isobutane or isopentane capable of expanding the shell. When the expandable hollow microspheres are heated to 110~200° C. at atmospheric pressure, the polymethylmethacrylate shell is softened and isobutane or isopentane is expanded to form spherical hollow spheres having a diameter of 10–200 μm. The expandable hollow microspheres used in the present invention are commercially available, where any other microspheres including a blowing agent such as isopentane, n-pentane, isobutane, or n-butane can be used for the same purpose. The present inventors have found that a highly porous ceramic having uniformly distributed pores can be fabricated by mixing expandable hollow microspheres and a preceramic polymer, if necessary, a ceramic powder, as starting materials, molding the mixture into a molded body by common molding processes, heating the molded body at 1 atm above the softening temperature or 110~200° C. according to the kind of the preceramic polymer to soften the preceramic polymer, to expand the hollow microspheres and to form uniformly distributed pores throughout the preceramic polymer, followed by curing and pyrolysis.

In particular, the highly porous ceramic of the present invention thus fabricated has a porosity of not less than 60% and a pore density of not less than $10^8$ pores/cm$^3$. addition, the highly porous ceramic of the present invention has uniformly distributed pores and the ceramic has been processed under atmospheric pressure. Furthermore, the highly porous ceramic of the present invention has an advantage that it can be fabricated at a relatively low temperature of 1,500° C. or less only by pyrolysis of the preceramic polymer without the need for a sintering process.

In order to accomplish the above objects of the present invention, there is provided a method for fabricating a highly porous ceramic from expandable hollow microspheres and a preceramic polymer, comprising the steps of: homogeneously mixing a preceramic polymer powder, expandable hollow microspheres and a ceramic powder, and molding the mixture to form a molded body; heating the molded body to expand it; curing the expanded molded body; and pyrolyzing the cured molded body.

According to one preferred embodiment of the present invention, the ceramic powder is at least one material selected from the group consisting of $Al_2O_3$, $ZrO_2$, MgO, SiC, TiC, $Si_3N_4$, AlN, TiN, $MoSi_2$, WC and mixtures thereof.

According to another preferred embodiment of the present invention, the ceramic powder is added in an amount of 50% by weight or less, based on the total weight of the starting materials.

In accordance with one aspect of the present invention, there is provided a method for fabricating a highly porous ceramic from expandable hollow microspheres and a preceramic polymer, comprising the steps of: homogeneously mixing a preceramic polymer powder and expandable hollow microspheres, and molding the mixture to form a molded body; h ting the molded body to expand it; curing the expanded molded body; and pyrolyzing the cured molded body.

According to one preferred embodiment of this aspect of the present invention, the expansion of the molded body is carried out by heating at a temperature of 110~200° C., the temperature range between the softening point and the melting point of the preceramic polymer, to expand the expandable hollow microspheres.

According to another preferred embodiment of the aspect of the present invention, the preceramic polymer is at least one polymer selected from the group consisting of polycarbosilane, polysiloxane, polysilazane and mixtures thereof.

According to another preferred embodiment of the aspect of the present invention, the preceramic polymer powder is added in an amount of 20% by weight or more, based on the total weight of the starting materials.

According to another preferred embodiment of the aspect of the present invention, the expandable hollow microspheres are added in an amount of 20% by weight or more, based on the total weight of the starting materials.

According to another preferred embodiment of the aspect of the present invention, the expandable hollow microspheres are spherical hollow materials having a diameter of 5–50 μm, each of which consists of a shell made of polymethylmethacrylate and an inner medium filled with isobutane or isopentane gas capable of expanding the shell, wherein upon heating to 110~200° C. the shell is softened and the gas is expanded to form hollow spheres having a diameter of 10–200 μm.

In accordance with another aspect of the present invention, there is provided a highly porous ceramic having a high porosity of not less than 60% and a pore density of not less than $10^8$ pores/cm$^3$ fabricated from expandable microspheres and a preceramic polymer.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, a method for fabricating a highly porous ceramic of the present invention, along with the highly porous ceramic will be explained in more detail.

Figure 1A:
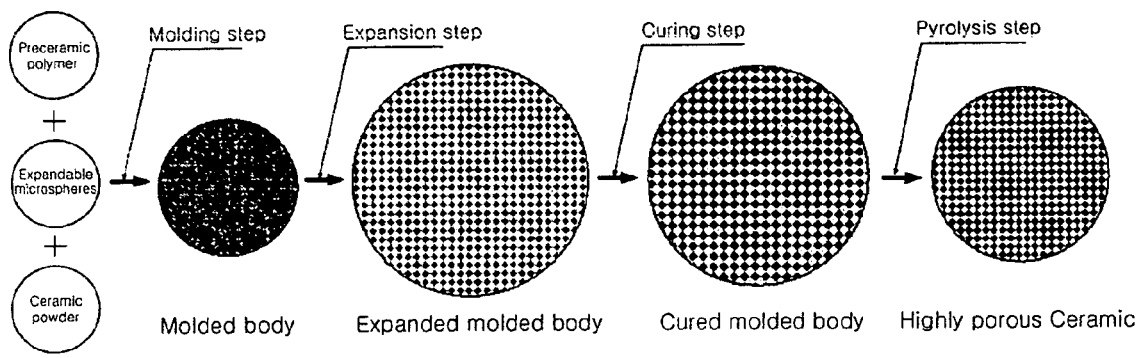
FIG. 1a is a process chart showing a method for fabricating a highly porous ceramic according to the present invention.
Figure 1B:
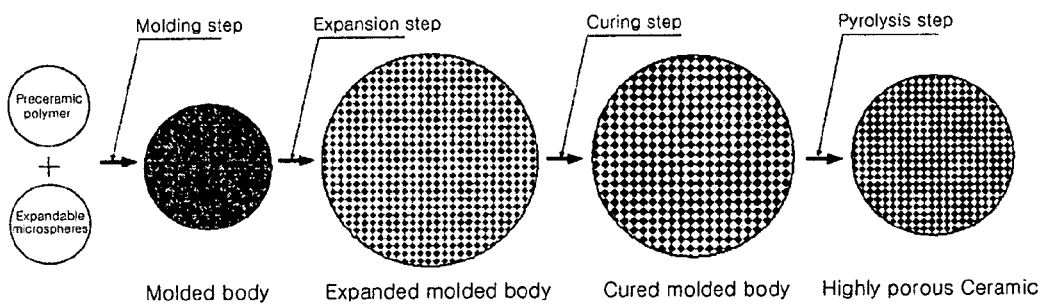
FIG. 1b is a process chart showing a method for fabricating a highly porous ceramic according to another aspect of the present invention.
Figure 2:
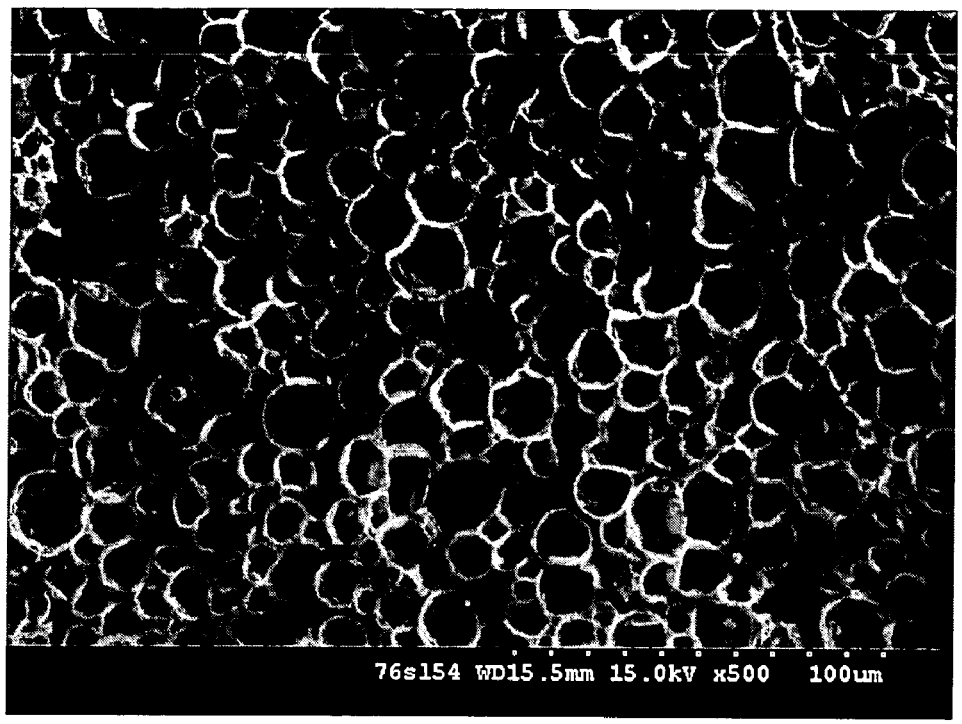
FIG. 2 is an electron microscopic image showing a highly porous ceramic fabricated from expandable microspheres and a preceramic polymer, in accordance with Example 5 of the present invention.
Figure 3:
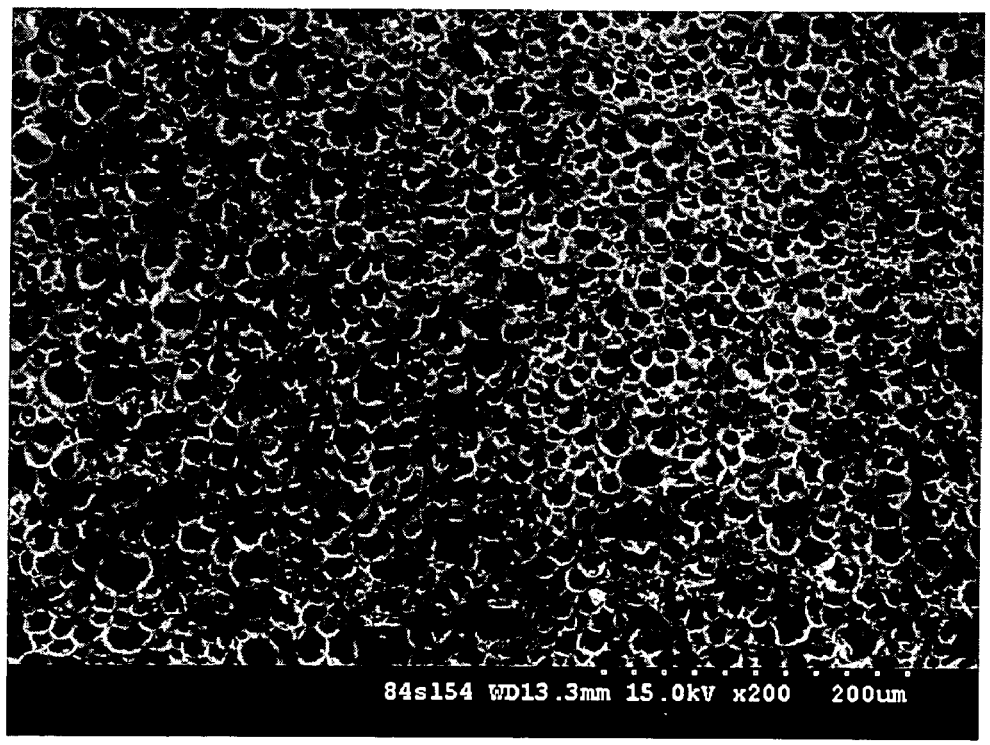
FIG. 3 is an electron microscopic image showing a highly porous ceramic fabricated from expandable microspheres and a preceramic polymer, in accordance with Example 8 of the present invention.

Two process charts showing a method for fabricating a highly porous ceramic according to the present invention are shown in FIGS. 1a and 1b, respectively.

As shown in FIGS. 1a and 1b, in the first step for fabricating the highly porous ceramic of the present invention, starting materials are homogeneously mixed and the mixture is molded into a molded body.

The highly porous ceramic of the present invention requires the use of a preceramic polymer as one of the starting materials. Examples of the preceramic polymer used as an important raw material for fabricating the highly porous ceramic of the present invention include polycarbosilane, polysiloxane, polysilazane, etc. All these polymers contain silicon atoms (Si). The preceramic polymer is preferably used in the form of a powder having a particle size of 44 μm or smaller. If desired, at least one preceramic polymer powder may be further added, depending on the desired properties of the highly porous ceramic to be fabricated.

The highly porous ceramic of the present invention needs the use of expandable hollow microspheres as one of the starting materials. The expandable hollow microspheres are spherical materials having a diameter of 5–50 μm, each of which consists of a shell made of polymethylmethacrylate (PMMA) and an inner medium filled with isobutane or isopentane capable of expanding the shell.

The highly porous ceramic of the present invention may require the use of a ceramic powder as one of the starting materials. As noted above, the highly porous ceramic of the present invention may be fabricated from a mixture of the expandable microspheres and the preceramic polymer, without the addition of the ceramic powder.

The ceramic powder acts as a filler which plays a role to help facilitate the exhaust of gas occurring during pyrolysis and to prevent excessive shrinkage. The gas exhaust results from the decomposition of the preceramic polymer in the molded body. As the ceramic powder, SiC, $Si_3N_4$, $SiO_2$, etc., can be used.

The ceramic powder can also be added for changing the composition of the highly porous ceramic to be fabricated. As the ceramic powder for this purpose, $Al_2O_3$, $ZrO_2$, MgO, SiC, TiC, $Si_3N_4$, AlN, TiN, $MoSi_2$, WC, etc., can be used. In addition, at least one ceramic powder may be further added, depending on the desired properties of the highly porous ceramic to be fabricated.

It is preferred that the preceramic polymer as one of the starting materials is added in an amount of at least 20% by weight, based on the total weight of the starting materials. Within this range, the preceramic polymer can combine the expandable hollow microspheres that are softened during expansion, with the filler. When the preceramic polymer is added in an amount of less than 20%, the combination of the expandable microspheres and the ceramic powder is poor upon expanding. Accordingly, the strength of the molded body is too poor to carry out the subsequent step (curing step).

It is preferred that the expandable hollow microspheres as one of the starting materials are added in an amount of at least 20% by weight, based on the total weight of the starting materials. When the content of the expandable hollow microspheres is less than 20%, the porous ceramic to be fabricated has a low porosity of less than 60%.

The filler or the ceramic powder added to change the composition of the highly porous ceramic to be fabricated is preferably added in an amount of not more than 50% by weight, based on the total weight of the starting materials. When the amount of the filler or the ceramic powder added exceeds 50%, the ceramic powder is not softened at a temperature for expanding the hollow microspheres and thus prevents the sufficient expansion of the hollow microspheres. For this reason it is difficult to fabricate a highly porous ceramic having a porosity of 60% or more.

On the other hand, a curing agent may be added to shorten the curing time, in the step for curing the preceramic polymer. For example, in the case of polycarbosilane or polysilazane, the preceramic polymer can be cured by oxygen in air. In the case of polysiloxane, the preceramic polymer is heated slowly to induce dehydration for curing.

The curing agent need not necessarily be used, but the use of the curing agent shortens the curing time. For example, when the preceramic polymer (e.g., polysiloxane) is slowly heated without any curing agent, it takes 36 hours or more to complete the curing of preceramic polymer. In contrast, when the preceramic polymer is cured using a curing agent, the curing is completed within 6 hours.

Examples of the curing agent for polysiloxane include ethoxysilanes and methylmethoxysilanes, etc.

The addition of the curing agent is preferably carried out by brushing the curing agent on the expanded molded body at room temperature. The weight of the curing agent added is preferably 5% by weight or less, based on the weight of the preceramic polymer. When the curing agent is added in an amount exceeding 5% by weight, the curing agent rapidly cures the preceramic polymer, thus damaging the pore structure.

In order to fabricate the highly porous ceramic of the present invention, the preceramic polymer, the expandable microspheres and the ceramic powder, or the preceramic polymer and the expandable microspheres should be mixed homogeneously using mixing processes, e.g., ball milling, well known in the art.

The mixture is then molded into a molded body with a particular shape by known molding processes, e.g., uniaxial pressing or cold isostatic pressing. In addition to these molding processes, extrusion or injection molding process may be optionally used.

In the second step (expansion step) for fabricating the highly porous ceramic of the present invention, the molded body is placed in a common heater or drier, and heated to a predetermined temperature to soften the preceramic polymer, and at the same time, to expand the expandable hollow microspheres.

In the expansion step, the heating temperature is preferably within the range of 110~200° C. When the temperature is lower than 110° C., the expandable hollow microspheres are not sufficiently expanded. When the temperature is higher than 200° C., the viscosity of polymethylmethacrylate constituting the shells of the expandable hollow microspheres becomes too low, causing isobutane or isopentane as an inner medium capable of expanding the shell to leak outside the hollow microspheres. The leakage of the inner medium shrinks the expanded volume of the hollow microspheres and thus lowers the porosity of the highly porous ceramic to be fabricated.

The expansion step is preferably carried out by heating the preceramic polymer at a temperature between the softening point and the melting point of the preceramic polymer. The heating temperature may vary depending on the kind of the preceramic polymer. In order to promote the expansion of the hollow microspheres, softening of the preceramic polymer is required. Accordingly, it is preferred that the preceramic polymer is heated above the softening point. In addition, when the preceramic polymer is melted, the shape of the molded body is difficult to maintain. Accordingly, the expansion step is preferably carried out by heating the preceramic polymer below the melting point.

After heating to a desired temperature for the expansion step, the molded body is taken out from the heater and cooled to room temperature to maintain the volume of the expande molded body, and then maintained below the softening temperature.

In the third step (curing step) for fabricating the highly porous ceramic of the present invention, the curing step can be carried out in accordance with the following two procedures: i) heating at a predetermined temperature; and ii) brushing the curing agent.

Specifically, according to the procedure i) above, the expanded molded body is heat-treated at atmospheric pressure or in an inert atmosphere at a predetermined temperature for a given time. The heating temperature and time may vary depending on the kind of the preceramic polymer.

When polycarbosilane or polysilazane is used as the preceramic polymer, the molded body is preferably heat-treated at atmospheric pressure or in an inert gas such as Ar or $N_2$ at 150~260° C. for 1~24 hours. When polysiloxane is used as the preceramic polymer, the molded body is preferably heat-treated at atmospheric pressure at a rate of 3° C./minute to 80~200° C. for 36~54 hours.

According to the procedure ii) above, it is preferred that 5% or less of at least one curing agent selected from ethoxysilanes and methylmethoxysilanes is brushed on the expanded molded body at room temperature, and dried.

In the fourth step (pyrolysis) for fabricating the highly porous ceramic of the present invention, the pyrolysis step is carried out by heating the cured molded body at atmospheric pressure or in an inert atmosphere. During the pyrolysis, volatile components, e.g., components contained in the expanded hollow microspheres, carbon (C)-containing and H (hydrogen)-containing preceramic polymer, etc., are volatilized, but ceramic components, e.g., Si, O, C, N, etc., and added ceramic components remain.

The pyrolysis step is carried out at atmospheric pressure or in an inert atmosphere at 800~1500° C. for 1~12 hours. The pyrolysis conditions may vary depending on the desired composition of the desired highly porous ceramic to be fabricated. When the cured molded body is heat-treated at a temperature lower than 800° C., the preceramic polymer is easily pyrolyzed, but no sintering occurs, causing poor strength of the highly porous ceramic. When the cured molded body is heat-treated at a temperature higher than 1,500° C., carbon and oxygen-containing components present in the residues of the pyrolyzed preceramic polymer react with each other to form volatile gases, e.g., CO or $CO_2$. Accordingly, the high temperature heat treatment of the molded body is undesirable.

During the pyrolysis, the temperature is preferably elevated to 800° C. at a rate of 5° C. or less per minute. If the elevation of temperature is faster than 5° C. per minute, the preceramic polymer is rapidly pyrolyzed, which causes the occurrence of cracks in the molded body.

Hereinafter, the present invention will be described in more detail with reference to the following Examples.

EXAMPLE 1

First, a preceramic polymer powder having an average particle size of 44 μm or smaller, expandable hollow microspheres having a diameter of 6~12 μm and a ceramic powder as starting materials were prepared. At this time, the expandable hollow microspheres were spherical materials having a diameter of 6~12 μm, each of which consists of a shell made of polymethylmethacrylate and an inner medium filled with isobutane capable of expanding the shell.

After the starting materials were mixed in accordance with mixing proportions shown in Tables 1 and 2 below, the mixture was charged into a polyethylene ball mill with Teflon balls and subjected to a dry ball milling for 12 hours.

The milled mixture was uniaxially pressed in a rectangular mold (30×30×4 mm) under a pressure of 100 kg/cm² to form a molded body.

The rectangular molded body was expanded, cured and pyrolyzed under the conditions shown in Tables 1 and 2 below to fabricate a highly porous ceramic.

Comparative Example shown in Table 1 represents a highly porous ceramic fabricated by mixing a ceramic with a preceramic polymer, uniaxially pressing the mixture, followed by sintering (see U.S. Pat. No. 5,358,910).

The pore size, pore density (the number of pores per unit volume) and porosity (volume fraction of pores relative to the overall volume) measurements were made from the electron microscopic images of highly porous ceramics fabricated under the conditions shown in Tables 1 and 2 below. The results are shown in Tables 3 and 4 below.

The pore size was determined using a image analyzer (Image-Pro Plus, Media Cybernetics, Inc., Silver Spring, Md., USA), based on the electron microscopic images.

TABLE 1

| Example Nos. | | Compositions (wt %) | Expansion conditions (Temp.) | Curing conditions (Temp., time) | Heat treatment conditions (Temp., time, atmosphere) |
|---|---|---|---|---|---|
| Comp. Exa. | 1 | SiC 84.85% + siloxane 15% + butylperoxy dimethylhexane 0.15% | — | — | 1600° C., 1 hr, Ar |
| | 2 | SiC 89.9% + siloxane 10% + butylperoxy dimethylhexane 0.1% | — | — | 2000° C., 1 hr, Ar |
| Exa. | 3 | Microspheres* 30% + SiC 20% + polycarbosilane 20% + polysiloxane 30% | 200° C. | 80° C., 24 hr + 110° C., 12 hr + 180° C., 12 hr | 1500° C., 1 hr, Ar |
| | 4 | Microspheres 40% + $Si_3N_4$ 30% + polysilazane 30% | 180° C. | 250° C., 12 hr | 1450° C., 3 hr, $N_2$ |
| | 5 | Microspheres 50% + $SiO_2$ 20% + polysiloxane 30% | 140° C. | 80° C., 24 hr + 110° C., 24 hr + 180° C., 2 hr | 1100° C., 1 hr, $N_2$ |

TABLE 1-continued

| Example Nos. | Compositions (wt %) | Expansion conditions (Temp.) | Curing conditions (Temp., time) | Heat treatment conditions (Temp., time, atmosphere) |
|---|---|---|---|---|
| 6 | Microspheres 60% + ZrO$_2$ 10% + Polysiloxane 30% | 150° C. | 80° C., 24 hr + 110° C., 24 hr + 180° C., 2 hr | 1200° C., 1 hr, Air |
| 7 | Microspheres 70% + SiO$_2$ 10% + polysiloxane 20% | 130° C. | 80° C., 36 hr + 190° C., 6 hr | 1300° C., 1 hr, Air |
| 8 | Microspheres 55% + SiO$_2$ 10% + polysiloxane 35% | 140° C. | 80° C., 24 hr + 110° C., 24 hr + 180° C., 2 hr | 1100° C., 1 hr, N$_2$ |
| 9 | Microspheres 65% + Al$_2$O$_3$ 5% + Polycarbosilane 30% | 195° C. | 180° C., 24 hr | 1500° C., 6 hr, Ar |

*Expandable hollow microspheres

TABLE 2

| | Example Nos. | Compositions (wt %) | Expansion conditions (Temp.) | Curing conditions (Temp., time) | Heat treatment conditions (Temp., time, atmosphere) |
|---|---|---|---|---|---|
| Examples | 10 | Microspheres* 80% + polysiloxane 20% | 135° C. | 3% Ethoxysilane | 1400° C., 1 hr, N$_2$ |
| | 11 | Microspheres 70% + polysiloxane 30% | 135° C. | 2% Ethoxysilane | 1400° C., 1 hr, N$_2$ |
| | 12 | Microspheres 60% + polysiloxane 40% | 135° C. | 2% Ethoxysilane | 1400° C., 1 hr, N$_2$ |
| | 13 | Microspheres 50% + polysiloxane 50% | 135° C. | 2% Ethoxysilane | 1400° C., 1 hr, N$_2$ |
| | 14 | Microspheres 40% + polysiloxane 60% | 135° C. | 2% Ethoxysilane | 1400° C., 1 hr, N$_2$ |
| | 15 | Microspheres 54% + MgO 10% + polysiloxane 36% | 155° C. | 2% Ethoxysilane | 1300° C., 1 hr, Ar |
| | 16 | Microspheres 36% + SiO$_2$ 10% + polysiloxane 54% | 155° C. | 2% Methylmethoxysilane | 1300° C., 1 hr, Ar |
| | 17 | Microspheres 32% + SiO$_2$ 20% + polysiloxane 48% | 155° C. | 2% Methylmethoxysilane | 1300° C., 1 hr, Ar |
| | 18 | Microspheres 28% + SiO$_2$ 30% + polysiloxane 42% | 155° C. | 2% Methylmethoxysilane | 1300° C., 1 hr, Ar |
| | 19 | Microspheres 24% + SiO$_2$ 40% + polysiloxane 36% | 155° C. | 2% Methylmethoxysilane | 1300° C., 1 hr, Ar |
| | 20 | Microspheres 20% + SiO$_2$ 50% + polysiloxane 30% | 155° C. | 2% Methylmethoxysilane | 1300° C., 1 hr, Ar |
| | 21 | Microspheres 20% + MoSi$_2$ 50% + polysiloxane 30% | 165° C. | 2% Methylmethoxtsilane | 950° C., 1 hr Ar |
| | 22 | Microspheres 35% + WC 30% + polysiloxane 35% | 110° C. | 1% Methylmethoxysilane | 1100° C., 1 hr, Ar |
| | 23 | Microspheres 35% + TiC 30% + polysiloxane 35% | 125° C. | 2% Methylmethoxysilane | 1300° C., 1 hr, Ar |
| | 24 | Microspheres 35% + SiC 30% + polysiloxane 35% | 135° C. | 4% Methylmethoxysilane | 800° C., 1 hr, Ar |
| | 25 | Microspheres 35% + Si$_3$N$_4$ 30% + polysiloxane 35% | 145° C. | 5% Methylmethoxysilane | 1300° C., 1 hr, N$_2$ |
| | 26 | Microspheres 35% + TiN 30% + polycarbosilane 35% | 200° C. | 150° C., 24 hr | 1400° C., 2 hr, N$_2$ |
| | 27 | Microspheres 40% + AlN 20% + polysilazane 10% + polysiloxane 30% | 195° C. | 80° C., 24 hr + 260° C., 6 H | 1500° C., 3 hr, N$_2$ |

TABLE 3

| | Example Nos. | Porosity (%) | Pore size (μm) | Pore density (pores/cm$^3$) |
|---|---|---|---|---|
| Comparative Examples | 1 | 34 | 1~40 | 5 × 10$^7$ |
| | 2 | 38 | 2~45 | 3 × 10$^7$ |
| Examples | 3 | 60 | 10~20 | 1 × 10$^9$ |
| | 4 | 64 | 10~20 | 2 × 10$^9$ |
| | 5 | 65 | 10~22 | 3 × 10$^9$ |
| | 6 | 75 | 10~20 | 5 × 10$^9$ |
| | 7 | 88 | 10~25 | 2 × 10$^9$ |
| | 8 | 87 | 15~30 | 3 × 10$^9$ |
| | 9 | 84 | 8~20 | 5 × 10$^9$ |

TABLE 4

| Example Nos. | | Porosity (%) | Pore size (μm) | Pore density (pores/cm³) |
|---|---|---|---|---|
| Examples | 10 | 93 | 10~24 | $2 \times 10^9$ |
| | 11 | 90 | 10~25 | $2 \times 10^9$ |
| | 12 | 82 | 10~25 | $3 \times 10^9$ |
| | 13 | 65 | 7~25 | $1 \times 10^9$ |
| | 14 | 63 | 8~25 | $4 \times 10^9$ |
| | 15 | 70 | 10~25 | $1 \times 10^9$ |
| | 16 | 69 | 10~25 | $2 \times 10^9$ |
| | 17 | 65 | 8~25 | $2 \times 10^9$ | in an equal weight to the starting materials thereto, and then subjected to a ball milling using Teflon balls for 24 hours.

A slurry of the milled mixture was dried in a ventilating place, and then uniaxially pressed in a rectangular mold (30×30×4 mm) under a pressure of 150 kg/cm² to form a molded body.

The rectangular molded body was expanded, cured and pyrolyzed under the conditions shown in Table 5 to fabricate a highly porous ceramic.

The pore size, pore density and porosity measurements were made for the highly porous ceramics fabricated under the conditions shown in Table 5. The results are shown in Table 6

TABLE 5

| Example Nos. | | Compositions (wt %) | Expansion conditions (Temp.) | Curing conditions (Temp., time) | Heat treatment conditions (Temp., time, atmosphere) |
|---|---|---|---|---|---|
| Example | 28 | Microspheres* 60% + Al₂O₃ 15% + polysiloxane 25% | 145° C. | 80° C., 24 hr + 120° C., 24 hr + 150° C., 6 hr | 1300° C., 1 hr, Ar |
| | 29 | Microspheres 60% + Al₂O₃ 10% + polysiloxane 30% | 145° C. | 80° C., 24 hr + 120° C., 24 hr + 200° C., 6 hr | 1450° C., 3 hr, N₂ |
| | 30 | Microspheres 60% + Al₂O₃ 15% + polysiloxane 25% | 135° C. | 80° C., 24 hr + 120° C., 24 hr | 1100° C., 6 hr, Air |
| | 31 | Microspheres 60% + Al₂O₃ 15% + polysiloxane 25% | 125° C. | 80° C., 24 hr + 120° C., 24 hr + 180° C., 6 hr | 1200° C., 4 hr, Air |
| | 32 | Microspheres 60% + Al₂O₃ 15% + polysiloxane 25% | 115° C. | 80° C., 24 hr + 110° C., 24 hr + 160° C., 6 hr | 1400° C., 1 hr, Air |

*Expandable hollow microspheres

TABLE 4-continued

| Example Nos. | Porosity (%) | Pore size (μm) | Pore density (pores/cm³) |
|---|---|---|---|
| 18 | 67 | 10~22 | $3 \times 10^9$ |
| 19 | 62 | 10~22 | $1 \times 10^9$ |
| 20 | 61 | 10~25 | $2 \times 10^9$ |
| 21 | 68 | 10~25 | $2 \times 10^9$ |
| 22 | 70 | 10~25 | $2 \times 10^9$ |
| 23 | 65 | 10~25 | $1 \times 10^9$ |
| 24 | 71 | 8~20 | $2 \times 10^9$ |
| 25 | 67 | 10~25 | $2 \times 10^9$ |
| 26 | 69 | 12~22 | $2 \times 10^9$ |
| 27 | 60 | 10~20 | $3 \times 10^9$ |

TABLE 6

| Example Nos. | | Porosity (%) | Pore size (μm) | Pore density (pores/cm³) |
|---|---|---|---|---|
| Example | 28 | 90 | 15~30 | $1 \times 10^9$ |
| | 29 | 84 | 15~25 | $2 \times 10^9$ |
| | 30 | 69 | 10~20 | $6 \times 10^9$ |
| | 31 | 67 | 10~20 | $4 \times 10^9$ |
| | 32 | 61 | 12~25 | $3 \times 10^9$ |

EXAMPLE 2

First, polysiloxane having an average particle size of 44 μm or smaller preceramic polymer powder, expandable hollow microspheres having a diameter of 6~12 μm and a ceramic powder as starting materials were prepared. At this time, the expandable hollow microspheres were spherical materials having a diameter of 6~12 μm, each of which consists of a shell made of polymethylmethacrylate and an inner medium filled with isopentane capable of expanding the shell.

After the starting materials were mixed in accordance with mixing proportions shown in Table 5, the mixture was charged into a polyethylene ball mill, and ethanol was added As apparent from the above description, since the method for fabricating a highly porous ceramic according to the present invention uses expandable hollow microspheres as one of the starting materials, the highly porous ceramic has a high porosity of not less than 60% and a pore density of not less than $10^9$ pores/cm³ wherein the size and the distribution of the pores are uniform.

In addition, since the overall steps of the method according to the present invention can be carried out at atmospheric pressure without the need for the use of an autoclave and at a relatively low temperature of 1500° C. or lower, the present invention is economically advantageous.

Furthermore, since the highly porous ceramic of the present invention has higher porosity and pore density than conventional porous ceramics, it can be suitably used for various high temperature structural materials, kiln furniture, bulletproof materials, shock-absorbing materials, insulating materials, refractory materials, lightweight structural materials, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for fabricating a highly porous ceramic which has a high porosity of not less than 60% and a pore density of not less than $10^9$ pores/cm$^3$ from expandable microspheres and a preceramic polymer, comprising the steps of:

homogeneously mixing a preceramic polymer powder in an amount of 20% by weight or more, based on the total weight of the starting materials, expandable hollow microspheres in an amount of 20% by weight or more, based on the total weight of the starting materials and a ceramic powder in an amount of 50% by weight or less, based on the total weight of the starting materials, and molding the mixture to form a molded body;

heating the molded body to expand the molded body and the expandable hollow microspheres at a temperature of 110~200° C., the temperature range between the softening point and melting point of the preceramic polymer;

curing the expanded molded body; and pyrolyzing the cured molded body.

2. The method for fabricating a highly porous ceramic from expandable microspheres and a preceramic polymer according to claim 1, wherein the ceramic powder is at least one material selected from the group consisting of Al$_2$O$_3$, ZrO$_2$, MgO, TiC, Si$_3$N$_4$, AlN, TiN, MoSi$_2$, WC and mixtures thereof.

3. A method for fabricating a highly porous ceramic which has a high porosity of not less than 60% and a pore density of not less than $10^9$ pores/cm$^3$ from expandable microspheres and a preceramic polymer, comprising the steps of:

homogeneously mixing a preceramic polymer powder in an amount of 20% by weight or more, based on the total weight of the starting materials and expandable hollow microspheres in an amount of 20% or more, based on the total weight of the starting materials, and molding the mixture to form a molded body;

heating the molded body to expand the molded body, and the expandable hollow microspheres at a temperature of 110~200° C., the temperature range between the softening point and melting point of the preceramic polymer;

curing the expanded molded body; and pyrolyzing the cured molded body.

4. The method for fabricating a highly porous ceramic from expandable microspheres and a preceramic polymer according to claim 1, wherein the preceramic polymer is at least one polymer selected from the group consisting of polycarbosilane, polysiloxane, polysilazane and mixtures thereof.

5. The method for fabricating a highly porous ceramic from expandable microspheres and a preceramic polymer according to claim 1, wherein upon heating the expandable hollow microspheres to 110~200° C. at atmospheric pressure, the shell is softened and the inner medium is expanded to form spherical hollow spheres having an average diameter of 10–200 μm.

6. The method for fabricating a highly porous ceramic from expandable microspheres and a preceramic polymer according to claim 3, wherein the preceramic polymer is at least one polymer selected from the group consisting of polycarbosilane, polysiloxane, polysilazane and mixtures thereof.

7. The method for fabricating a highly porous ceramic from expandable microspheres and a preceramic polymer according to claim 3, wherein upon heating the expandable hollow microspheres to 110~200° C. at atmospheric pressure, the shell is softened and the inner medium is expanded to form spherical hollow spheres having an average diameter of 10–200 μm.

* * * * *